(12) United States Patent
Gonopolskiy

(10) Patent No.: US 12,045,567 B1
(45) Date of Patent: Jul. 23, 2024

(54) NATURAL LANGUAGE PROCESSING BASED DETERMINATION OF SERVICE CONTROLS FOR EXTERNAL SERVICES USED BY AN ORGANIZATION

(71) Applicant: Interstice Labs, Inc., Palo Alto, CA (US)

(72) Inventor: Aleksandr Olegovich Gonopolskiy, Berlin (DE)

(73) Assignee: INTERSTICE LABS, INC., Palo Alto, CA (US)

( * ) Notice: Subject to any disclaimer, the term of this patent is extended or adjusted under 35 U.S.C. 154(b) by 205 days.

(21) Appl. No.: 17/700,267

(22) Filed: Mar. 21, 2022

(51) Int. Cl.
*G06F 40/279* (2020.01)
*G06F 40/126* (2020.01)
*G06F 40/205* (2020.01)

(52) U.S. Cl.
CPC .......... *G06F 40/279* (2020.01); *G06F 40/126* (2020.01); *G06F 40/205* (2020.01)

(58) Field of Classification Search
CPC ..... G06F 40/279; G06F 40/126; G06F 40/205
See application file for complete search history.

(56) References Cited

U.S. PATENT DOCUMENTS

| | | | | |
|---|---|---|---|---|
| 11,501,233 B2* | 11/2022 | Sabharwal | ............. | G06N 3/045 |
| 2011/0054843 A1* | 3/2011 | Han | .................... | H04L 12/2825 |
| | | | | 702/185 |
| 2023/0289282 A1* | 9/2023 | Khafizov | ............ | G06F 11/3688 |

* cited by examiner

*Primary Examiner* — Huyen X Vo
(74) *Attorney, Agent, or Firm* — FENWICK & WEST LLP

(57) ABSTRACT

A system determines service controls for organizations. The system receives documents from external systems representing reports storing information describing service controls for external services. The service controls are represented using natural language text. The system encodes the service controls using a natural language model to generate encoded service controls. The system determines similarity scores for pairs of service controls. The system determines one or more representative service controls for a category of external services based on similarity scores of pairs of the service controls. The system stores a mapping from categories of external services to representative service controls determined from the set of service controls corresponding to the category of external services. The system uses the mapping for determining representative service controls for external services corresponding to a set of services used by an organization.

20 Claims, 7 Drawing Sheets

NATURAL LANGUAGE PROCESSING BASED DETERMINATION OF SERVICE CONTROLS FOR EXTERNAL SERVICES USED BY AN ORGANIZATION

BACKGROUND

The disclosure relates to natural language processing of reports in general and more specifically to using natural language processing to determine service controls for external services used by an organization.

Organizations delegate controls on services used by the organization to safeguard privacy and security of user data stored and processed by the organization. The controls may be used to ensure security, availability, privacy, and so on for data processed and for the technology used by the organization. For example, security controls may ensure that malicious users are not able to get unauthorized access to the computing resources and data stored by the organization. The organization may require controls related to confidentiality that determines the users who are allows data access. Similarly, organization may require controls for ensuring privacy of personal information of users. An organization may be a multi-tenant system that stores and processes data for multiple tenants. The multi-tenant system needs to implement controls to provide assurance to tenant systems that their data is being maintained securely. A service of the organization may use other services provided by external systems. For example, a service may use a cloud platform such as AWS (Amazon Web Service), GCP (Google Cloud Platform) or Azure. The organization needs to ensure that appropriate service controls are enforced by the external systems. Organizations typically have control over services offered by the organization. However, it is difficult for the organization to determine and enforce controls for services offered by external systems.

SUMMARY

Described embodiments determine service control requirements for external service providers used by organizations. A system receives documents from external systems that may be associated with organizations. Each document represents a report storing information describing service controls for external services used by the organization. A service control is represented using natural language text. The system extracts a set of service controls for a category of external services from the documents. The system accesses a natural language model configured to receive an input natural language text and generate an encoded representation of the input natural language text. The system executes the natural language model for each service control from the set of service controls, to generate encoded service controls. The system determines similarity scores for the pairs of service controls. The system determines one or more representative service controls for the category of external services based on the similarity scores of the pairs of the service controls. The system stores a mapping from categories of external services to representative service controls determined from the set of service controls corresponding to the category of external services. The system uses the mapping for determining representative service controls for external services corresponding to a set of services of an organization.

In an embodiment, the system determines the representative service controls as follows. The system filters the plurality of pairs of service controls to determine a subset of pairs of service controls having more than a threshold similarity score. The system groups the subset of pairs of service controls into sub-groups of pairs of service controls. The system determines the representative service control for sub-groups of pairs of service controls.

In an embodiment, the system determines a service control that is most dissimilar to the centroid service control within a sub-group of related controls based on the similarity scores of the pairs of the service controls.

According to an embodiment, the system determines service control tests for services associated with an organization. The system receives a plurality of documents representing reports. The system reports store information describing service control tests performed for service controls of external services. Each service control and service control tests represented using natural language text. The system extracts a set of service controls and corresponding service control tests from the documents. The system accesses a natural language model configured to receive an input natural language text and generate an encoded representation of the input natural language text. The system executes the natural language model for each extracted service control to generate an encoding of the extracted service control. The system stores a mapping from encoded service controls to service control tests. The system receives an input set of service controls. The system executes the natural language model to generate an encoding of each of the received service controls. The system compares encodings of received service controls with encodings of extracted service controls of the mapping based on similarity scores. The system selects a service control test corresponding to the best matching input service control using the mapping for each input service control. The system provides the selected service controls for including in a report.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

Overall System Environment

Figure 1:
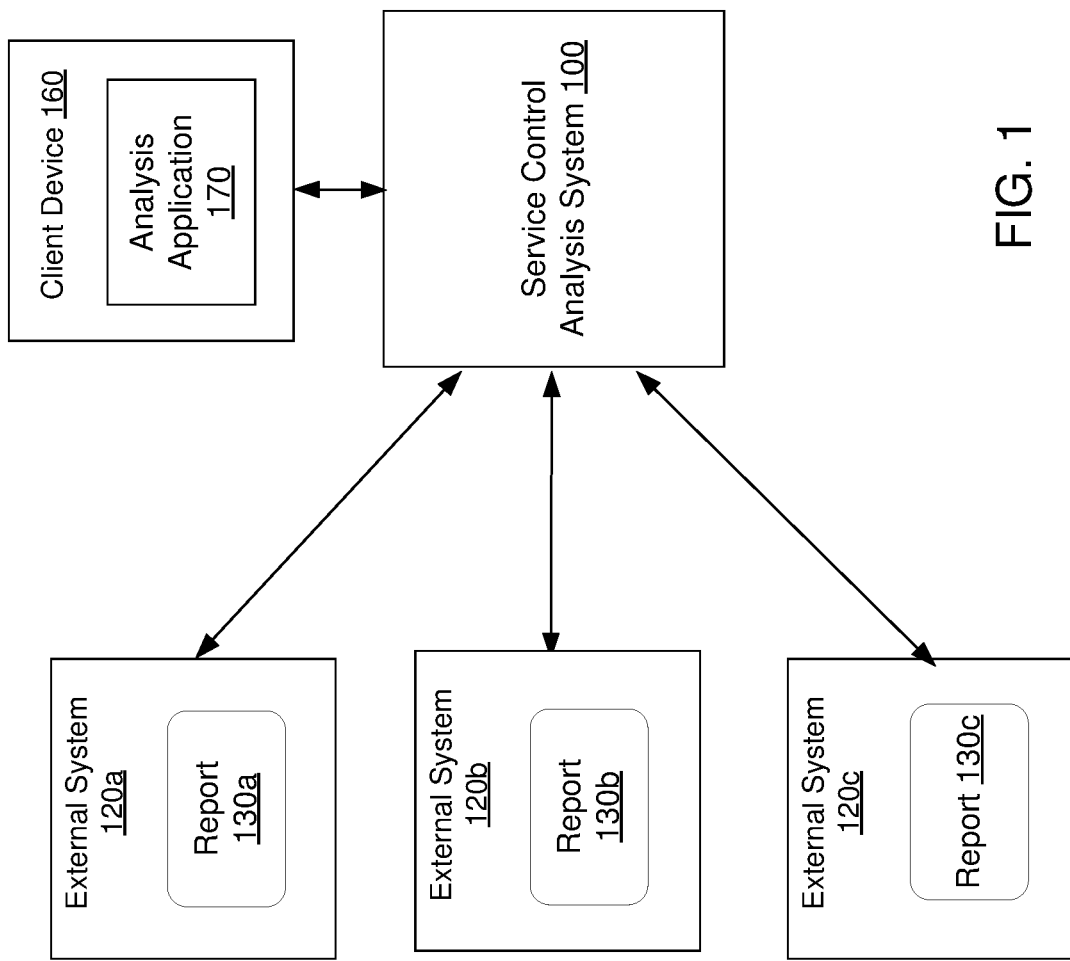
FIG. 1 shows the overall system environment for analyzing service controls for an organization, according to an embodiment.

FIG. 1 shows the overall system environment for analyzing service controls for an organization, according to an embodiment. The overall system environment includes a service control analysis system 100, one or more external systems 120, and a client device 160. In other embodiments, more or less components than those indicated in FIG. 1 may be used. For example, external systems 120, client device 160, and reporting system 150 may interact with service control analysis system 100 via a network (not shown in FIG. 1). Furthermore, there may be more or less instances of each system shown in FIG. 1, for example, there may be multiple client devices 160.

The service control analysis system 100 receives documents representing reports from one or more external systems. These reports describe service controls associated with other organizations. The service control analysis system 100 analyzes the received reports to determine a mapping from categories of services to service controls and mappings from service controls to service control tests. The service control analysis system 100 allows organizations to use the extracted information for determining service controls and service control tests for services they are providing. For example, an organization may use the analysis application 170 running on a client device 160 to provide description of services they offer and analyze them. The service control analysis system 100 analyzes the received description of services to provide description of service controls and service control tests associated with the services specified. In an embodiment, the service control analysis system 100 automatically generates a report or portions of a report describing the service controls for the organization.

FIG. 1 and the other figures use like reference numerals to identify like elements. A letter after a reference numeral, such as "130a," indicates that the text refers specifically to the element having that particular reference numeral. A reference numeral in the text without a following letter, such as "130," refers to any or all of the elements in the figures bearing that reference numeral (e.g. "130" in the text refers to reference numerals "130a" and/or "130b" in the figures).

System Architecture of the Service Control Analysis System

Figure 2:
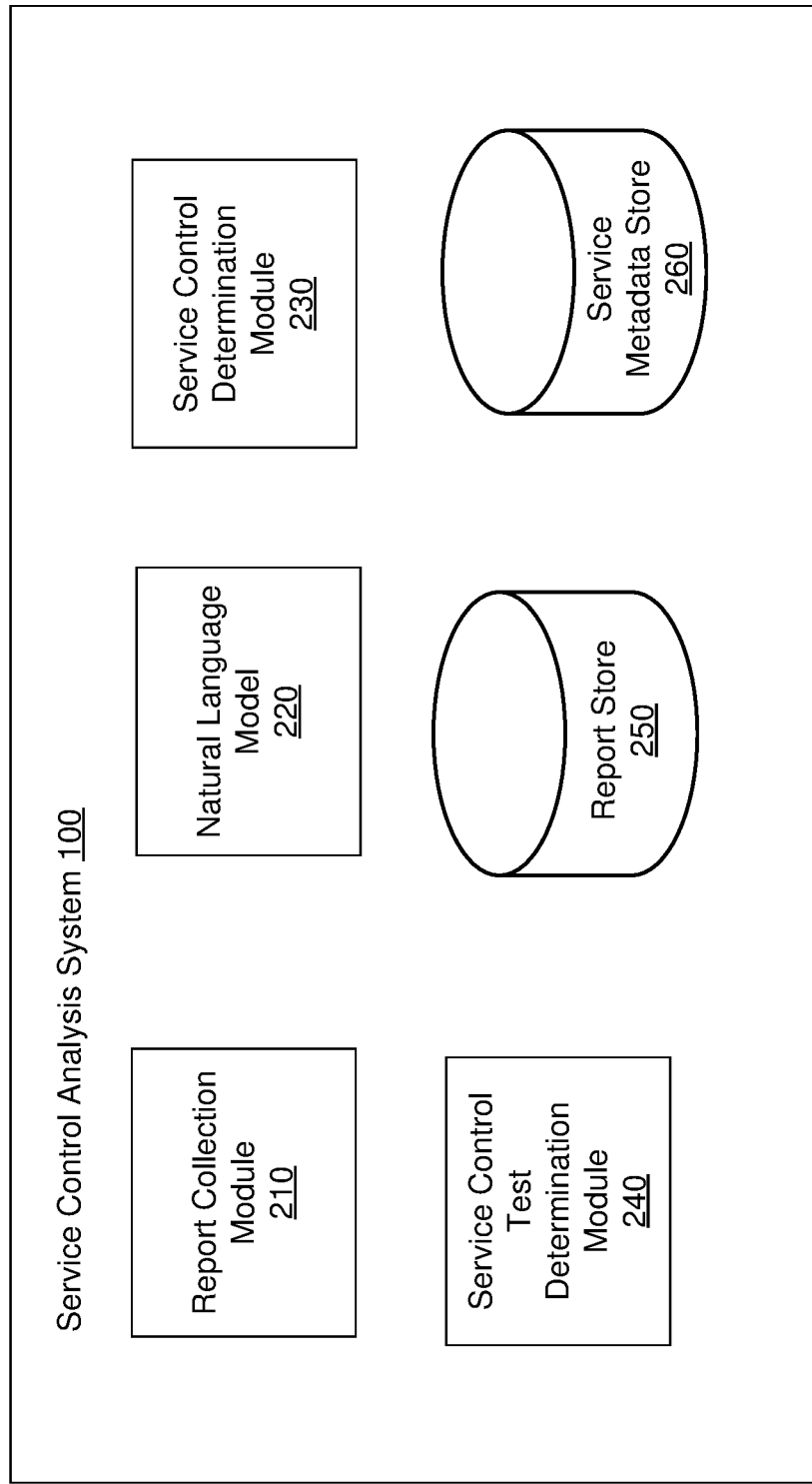
FIG. 2 shows the architecture of a service control system, according to an embodiment.

FIG. 2 shows the system architecture of the service control analysis system 100, according to an embodiment. The service control analysis system 100 includes a report collection module 210, a natural language model 220, a service control determination module 230, a service test determination module 240, a report store 250, and a service metadata store 260. In other embodiments, the service control analysis system 100 may include other modules not described herein. Functionality indicated as provided by a particular module may be implemented by other modules instead.

The report collection module 210 collects documents representing reports from external systems 120. The report collection module 210 may crawl the websites of various external systems to identify the reports. In an embodiment, the collection of some of the reports may be performed by a user. Alternatively, a list of URLs (uniform resource locators) is provided as input to the report collection module 210 and the report collection module 210 accesses the URLs to get web pages that are further analyzed to identify reports that are further downloaded. The reports downloaded are stored in the report store 250, The natural language model 220 receives an input natural language text and encodes the input natural language text to generate an encoded representation of the input natural language text, for example, a vector of numerical values representing features describing the input natural language text. In an embodiment, the natural language model is a neural network but is not limited to neural networks. The natural language model takes text represented in natural language as input and generates an encoding of the input natural language text. For example, the natural language model may receive as input a natural language sentence representing a service control and generate an encoding of the input natural language sentence. The encoding of the input natural language sentence may be a vector representation of a set of features describing the input natural language sentence. In an embodiment, the natural language model is an autoencoder that receives an input natural language sentence, generates an encoded representation of the input natural language sentence, and generates an output that matches the input natural language sentence from the encoded representation. The natural language model is trained using several natural language sentences.

The service control determination module 230 receives description of services of an organization and determines service controls associated with the services. In an embodiment, the service controls correspond to external services that may be invoked by the services of the organization. The service controls represent service controls extracted from documents collected from external systems. Examples of service controls include natural language sentences such as "All accesses to the system are logged by the system and stored in digital format", "Data center service room is equipped with access security system," "video data from surveillance cameras is recorded and archived for future use," "computer equipment is located in locked cabinets", "physical access to data center is reviewed in a monthly basis, "physical access points to server locations are managed by electronic access control devices," "electronic intrusion detection systems are installed in data server locations," and so on.

The service test determination module 240 receives description of services of an organization and determines service control tests associated with the services. In an embodiment, the service control tests correspond to external services that may be invoked by the services of the organization. The service control tests represent service controls extracted from documents collected from external systems.

The service metadata store 260 stores metadata describing services. A service may be a service of an organization of an external service invoked by a service of the organization.

The service metadata store 260 stores categories describing external services. Examples of categories of external services include a category of storage services, a category of compute services, a category of networking services, a category of document processing services, a category of CI/CD (continuous integration/continuous delivery) provider services (for example, GitHub), and so on.

Processes for Determining Service Controls

Figure 3:
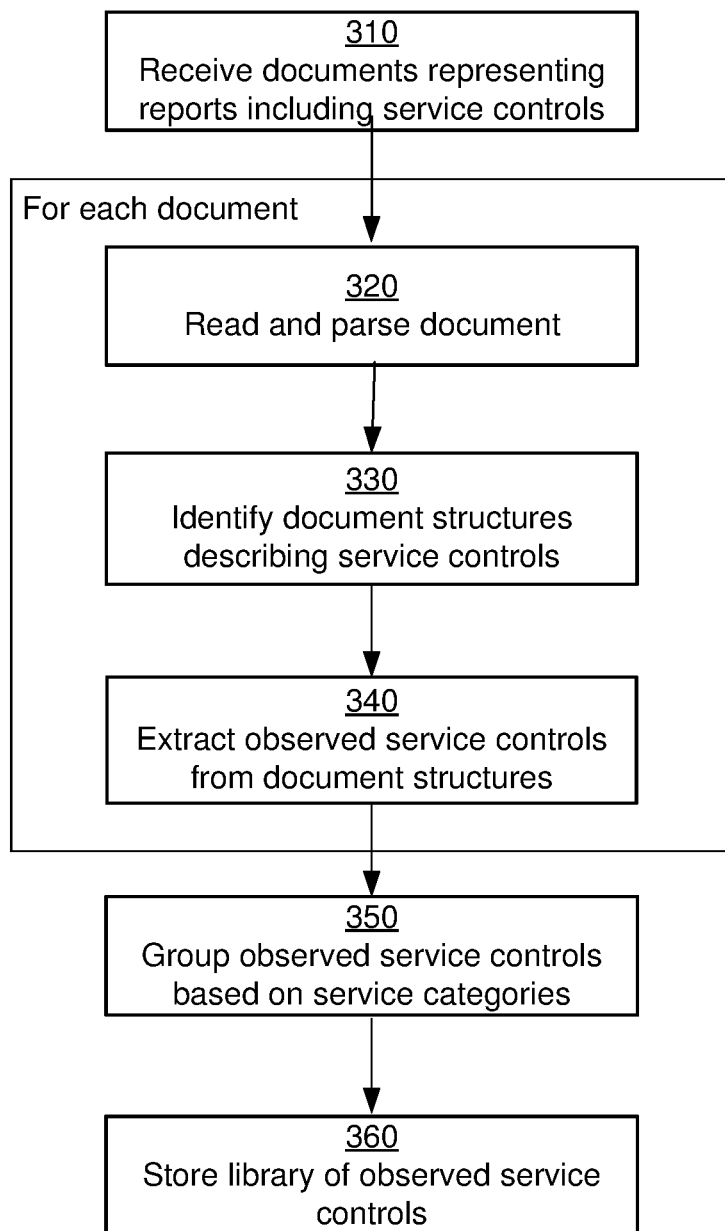
FIG. 3 shows a flowchart illustrating the process for extracting a library of service controls, according to an embodiment.
Figure 4:
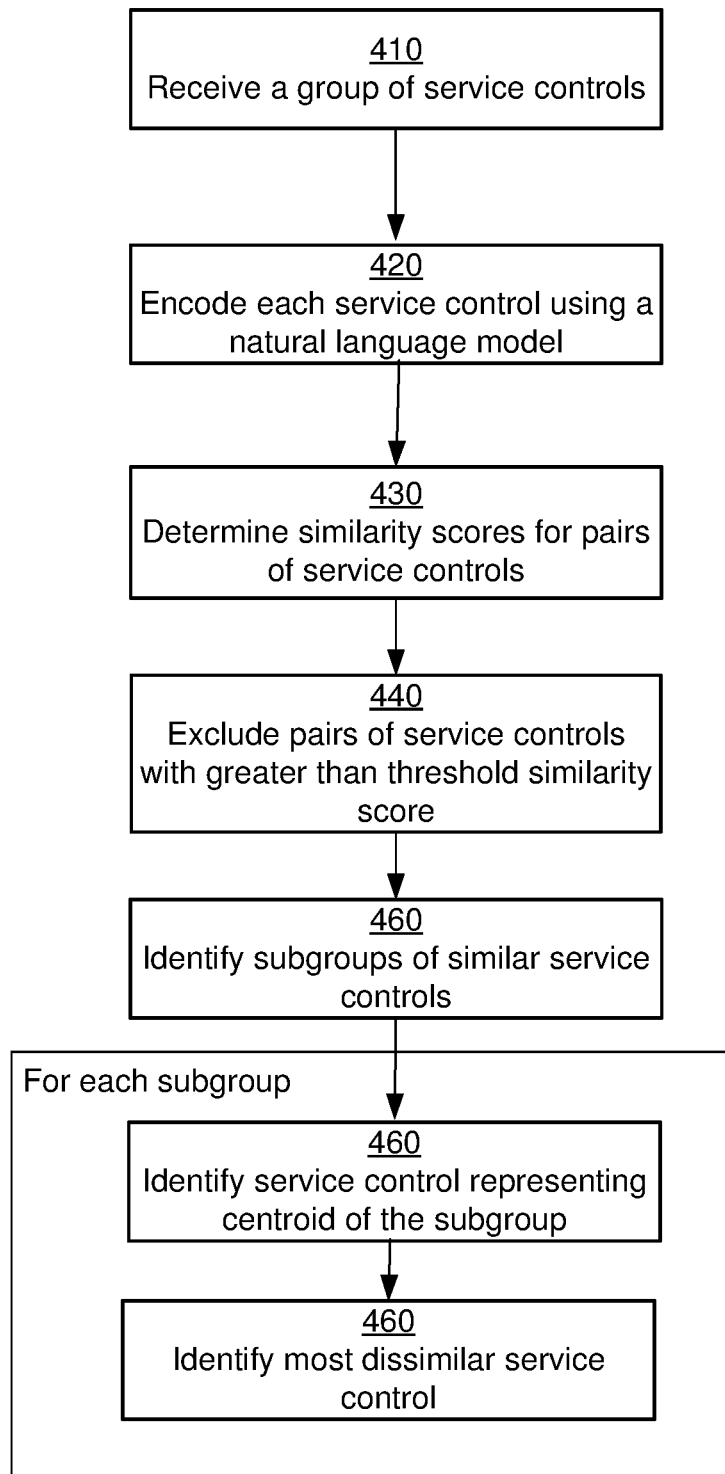
FIG. 4 shows a flowchart illustrating the process for determining representative service controls for categories of external services, according to an embodiment.
Figure 5:
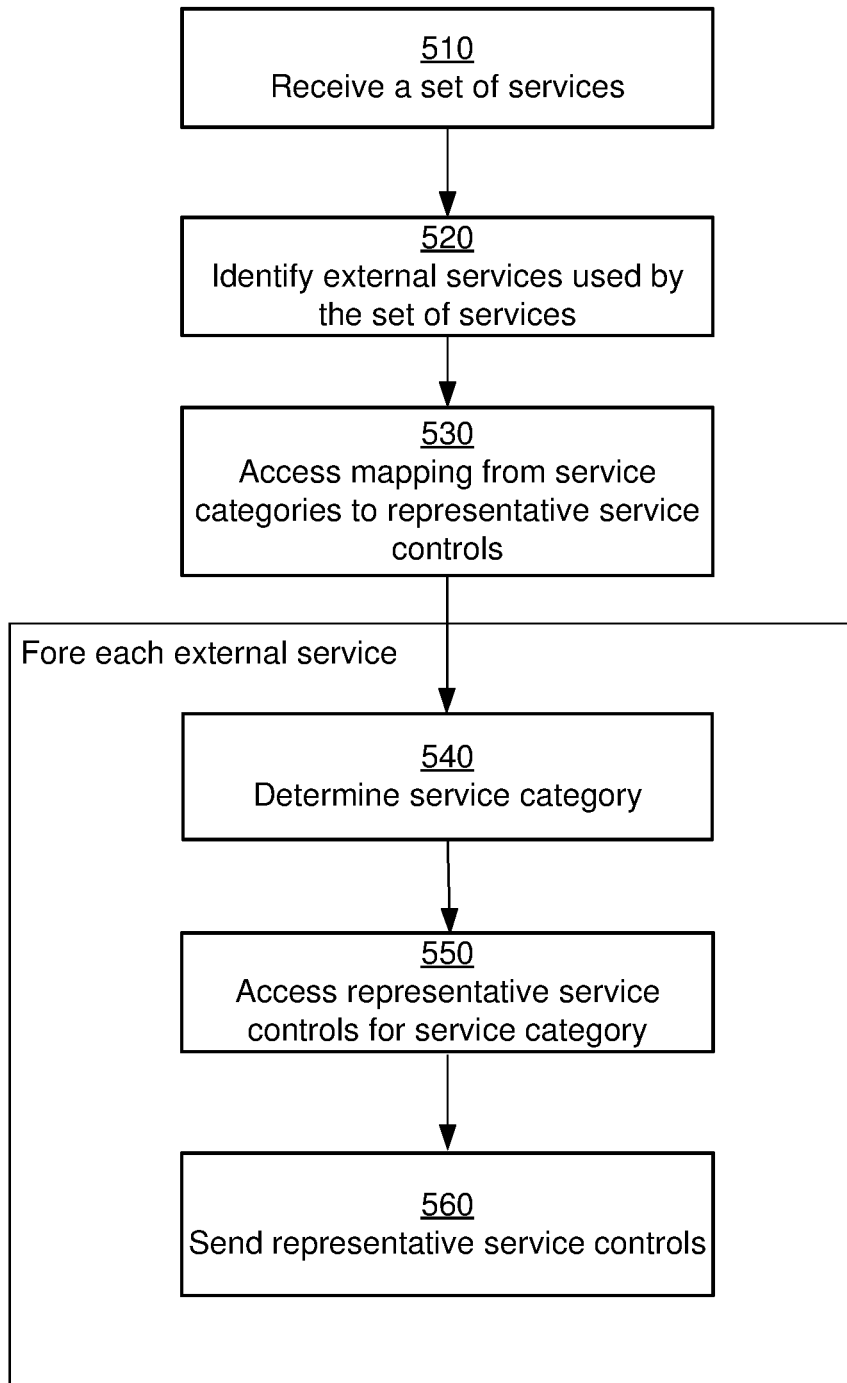
FIG. 5 shows a flowchart illustrating the process for determining service controls for an organization using the library of service controls, according to an embodiment.

Various processes are described herein that are executed by the service control analysis system 100 for determining service controls for an organization, for example, processes illustrated in FIGS. 3-5. The steps of the processes described herein may be executed in an order different from that indicated herein. The steps are described as being performed by a system, for example, the service control analysis system 100 and may be performed by various modules of the service control analysis system 100.

FIG. 3 shows a flowchart illustrating the process for extracting a library of service controls, according to an embodiment. The system, for example, the service control analysis system 100 obtains documents representing reports and builds a libraries of observed service controls based on information obtained from the documents.

The system receives 310 documents representing reports describing service controls that for various services. The documents may represent reports obtained from external system 120 that correspond to organizations that prepared the reports describing service controls that they identified in connection with services implemented by the organizations. In an embodiment, the documents are PDF (portable document format) documents but may be represented using any other document format, for example, JSON (JavaScript object notation) format, Microsoft WORD format, postscript format, and so on.

The system performs steps 320, 330, and 340 for each document received 310. The system reads and parses 320 the document. In an embodiment, the system includes parsers for various formats of documents and invokes the appropriate parser matching the format of the document.

In an embodiment, the system builds a data representation of the document. The data representation stores information describing various portions of the document using data structures that are easy to process. The system may store rules defining the portions of the documents that describe service controls of external services. In an embodiment, the rules specify regular expressions that match portions of the documents. The regular expressions may match section headings of various section of the document. Some regular expression may match table headings and or table column headers of tables stored in the document. For example, the document may store a table that includes a column identifying a service category and a column identifying the service controls corresponding to each service category. The regular expressions may match expected column headings to determine which column of the table represents the service category and which column represents service controls. For example, a regular expression "*subservice organization*" matching table headings may be used to identify the table storing service control information, a regular expression "*control*" matching column headings may be used to identify columns representing service controls and a regular expression "*category*" matching column headings may be used to identify the column storing service category. The regular expression matches may be performed in a case insensitive manner. In an embodiment, the system stores a set of regular expressions for identifying each portion of the documents. The set of regular expressions may be provided by an expert and may be obtained from documents that were previously analyzed. The set of regular expressions may be updated as new documents are obtained, for example, by adding new regular expressions, modifying existing regular expressions, and so on.

The system identifies 330 the data structures that represent the information describing the service controls corresponding to external services used by the organization that provided the document. Examples of data structures include tables stored in documents, sections of the documents, and so on. The system extracts 340 the information describing the service controls used by external services from the identified 330 data structures. Each service control may be represented as one or more natural language sentences. The system may process a natural language sentence to normalize the sentence and keywords used in the sentence.

The system groups 350 the service controls based on categories of external services. The system may store a few hundred service controls for each service category. The set of service controls may be growing over time as new documents are received and processed by the system. The service controls extracted from the documents are also referred to as observed service controls.

The system stores 360 a library of observed service controls based on the information extracted from the documents. In an embodiment, the library of observed service controls stores a mapping from various service groups to service controls. This mapping may be referred to as the service control mapping. The library may store the service control mapping along with the library of observed service controls. The system further processes the information stored in the library of observed service controls using processed such as the process described in FIG. 4.

FIG. 4 shows a flowchart illustrating the process for determining representative service controls for categories of external services, according to an embodiment. The process illustrated in FIG. 4 may be used for processing a group of service controls, for example, a set of service controls corresponding to a category of external services or a set of service controls corresponding to an external service.

The system receives 410 a group of service controls. The received group of service controls may represent all service controls corresponding to a category of external services. The system accesses a natural language model for encoding the service controls and encodes 420 each service control using the natural language model.

The system uses the encoded representations of the service controls to compare service controls. The system determines 430 similarity scores for pairs of service controls. The similarity score may be determined using vector operation performed on a pair of input encoded representations of service controls. For example, the system may determine a cosine similarity of two vectors to determine similarity score of the two vectors. The cosine similarity of two vectors is determined as the dot product of the two vectors divided by the product of the magnitude of the two vectors.

In an embodiment, the system creates a similarity matrix Ms that stores similarity scores for each pair of service controls. For example, if there are N service controls, the similarity matrix is of size N×N and stores a similarity score for each pair of service controls.

The system selects a subset of the pairs of service controls that indicate higher measure of similarity compared to other pairs. For example, the system uses a threshold similarity score (i.e., a cut off similarity score value, for example, a value of 0.8 or 0.7 or 0.6) and excludes all pairs of service controls that have similarity score below the threshold similarity score. The threshold similarity score may be a configurable value that may be determined experimentally or specified by an expert. The system excludes 440 pairs of service controls from the similarity matrix that have similarity score below the threshold similarity score to create an adjacency matrix M A. The adjacency matrix M A represents pairs of service controls that have higher measure of similarity on an average compared to the pairs of service controls of the similarity matrix Ms. The system uses the adjacency matrix M A as a representation of a graph G of similar service controls within the input group of service controls.

The system identifies 460 sub-groups of similar service controls from the input group of service controls using the graph representation G of service controls based on the adjacency matrix M A. In an embodiment, the system selects cliques within the graph G, where a clique represents a subgraph with all nodes connected to other nodes of the subgraph. The system may use any other measure of closely connected subgraphs within the graph G that represent a cluster of similar service controls identified within the received group of service controls.

The system identifies representative service controls for each sub-group of service controls. The system identifies 460 a service control representing the centroid of the sub-group. The centroid of the sub-group represents the most central service control within the sub-group. Accordingly, the system determines a subset of service controls that represent the group of service controls corresponding to a category of external services. For example, if the input group has a couple of hundred service controls, the system selects approximately 3 to 10 representative service controls corresponding to the category of external services. In an embodiment, the system further identifies a service control that is most dissimilar compared to the centroid service control. The system selects that service control that has the smallest similarity score compared to the centroid service control. The system uses the centroid service control and the service control that is most dissimilar to the centroid service control as the representative service controls of a sub-group or the received group.

In an embodiment, the system further uses the natural language model to summarize the group of service controls by selecting 2 or 3 most salient service controls from the group even further. According to an embodiment, the system uses a transformer model that is modified to generate summaries given a number of sentences. In an embodiment, the system generates a summary comprising a paragraph by picking the most salient sentences. The transformer model may be a neural network.

The system stores the representative service controls for various external services or categories of external services in the library of observed service controls. The system uses the library of observed service controls to select and recommend service controls for groups of services obtained from organizations.

FIG. 5 shows a flowchart illustrating the process for determining service controls for an organization using the library of service controls, according to an embodiment. The system receives 510 a set of services, for example, set of services used by an organization. The system identifies 520 external services invoked by services used by the organization. For example, some of the services used by the organization may use one or more external services. The system identifies all the external services used by the organization.

The system accesses 530 a mapping from categories of external services to representative service controls from the library of observed service controls. The system repeats the steps 540, 550, and 560 for each external service identified 520. The system determines 540 a service category for the external service. The system accesses 550 the representative service controls for the determined service category from the mapping. The system sends 560 the accessed representative service controls for the identified external services, for example, for display via a user interface of an application. The system may store accessed representative service controls for the identified external services in a data representation, for example, a data store. In an embodiment, the system automatically generates a report (or a portion of a report) for the organization based on the accessed representative service controls.

Processes for Determining Service Control Tests

Figure 6:
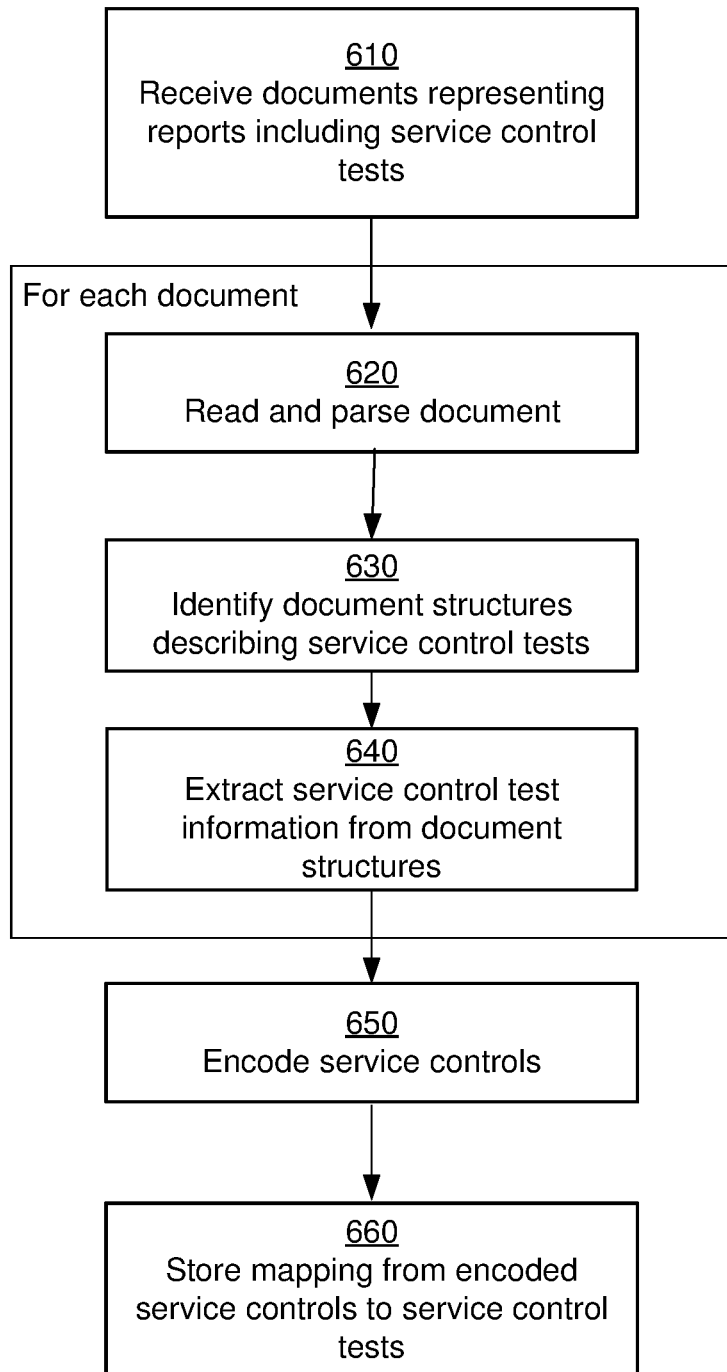
FIG. 6 shows a flowchart illustrating the process for extracting a library of service control tests, according to an embodiment.
Figure 7:
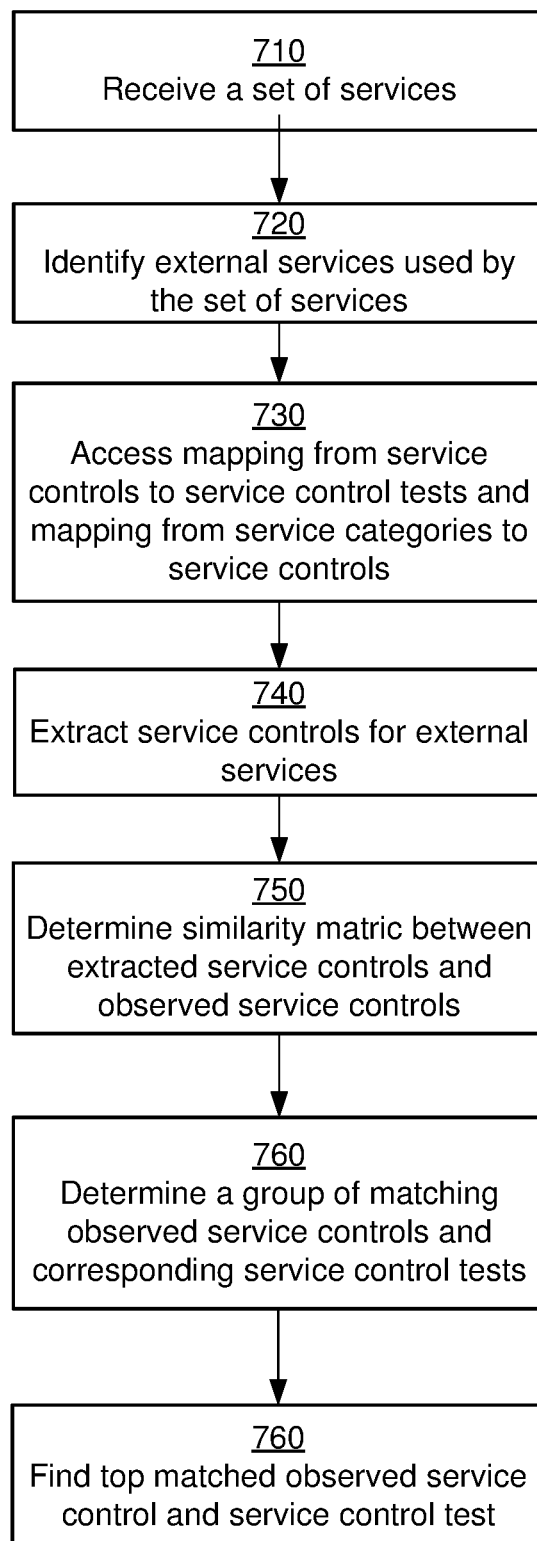
FIG. 7 shows a flowchart illustrating the process for determining service control tests for an organization using the library of service control tests, according to an embodiment.

Various processes are described herein that are executed by the service control analysis system 100 for determining service control tests for an organization, for example, processes illustrated in FIGS. 6-7. The steps of the processes described herein may be executed in an order different from that indicated herein. The steps are described as being performed by a system, for example, the service control analysis system 100 and may be performed by various modules of the service control analysis system 100. The service control tests are extracted from documents such as reports obtained from external systems. The service control tests may be represented as natural language text, for example, sentences or phrases. Examples of tests include "inspected a sample of emails to determine that users were directed with appropriate information," "inspected internal control matrix to determine that tasks were appropriately assigned," "inspected risk management policies to determine that risk assessment was performed on a regular basis," and so on. These service control tests represent tests that may have been previously implemented, for example, by auditors of organizations corresponding to the external system from where reports were obtained.

FIG. 6 shows a flowchart illustrating the process for extracting a library of service control tests, according to an embodiment. The system receives reports and analyzes them to extract service control tests. The extracted service control tests are used for determining service control tests for organizations.

The system receives 610 documents representing reports describing various information related to service controls including service control tests. The system performs the steps 620, 630, and 640 for each document received. The system reads and parses 620 the document received. The system identifies 640 document structures occurring in certain portions of the document describing service control tests. In an embodiment, the system searches for specific sections of the document that are determined to include the service control test information. These sections may be identified based on section numbers of sections known to describe the information. In an embodiment, the system identifies these sections by searching for specific keywords or phrases in the section title, for example, keywords "tests", "service tests", "test results", and so on.

The data structure extracted may represent a table included in the document that comprises columns and rows. The system extracts the different columns by performing matches with predefined regular expressions. In an embodiment, the system extracts columns representing service category, service control tests, and service control test results. For example, a regular expression '*test results*' matching table headings may be used to identify the table storing service control test information, a regular expression '*control*' matching column headings may be used to identify columns representing service controls, a regular expression '*test*' matching column headings may be used to identify the column storing service control tests, and a regular expression '*results*' or '*test results*' matching column headings may be used to identify the column storing service control test results.

The system extracts 640 information describing service control tests from the identified document structures. Accordingly, the system stores a service control test mapping that maps service controls to service control tests. A service control test may be stored as one or more natural language sentences. The system uses the service control test mapping to determine service control tests for a set of services provided by an organization. In some embodiments, a process similar to that illustrated in FIG. 4 is used to group service controls and their associated service control tests.

In some embodiments, the process illustrated in FIG. 4 is used to group service controls and their associated service control tests. A process according to another embodiment is illustrated in FIG. 7.

FIG. 7 shows a flowchart illustrating the process for determining service control tests for an organization using the library of service control tests, according to an embodiment. The system receives 710 a set of services associated with an organization. The system identifies 720 external services used by the set of services. Steps 710 and 720 are similar to steps 510 and 520 of the process illustrated in FIG. 5.

The system accesses 730 the service control test mapping that maps service controls to service control tests as determined by the process illustrated in FIG. 6. The system also accesses the mapping from service categories to the service controls as determined by the process illustrated in FIGS. 3-4. The system determines 740 the service controls for the external services, for example, using the service control mapping, using steps of the process illustrated in FIG. 5. The set of extracted service controls may be referred to as set S1. The set of service controls in the service control test mapping is referred to as set S2 or observed service controls.

The system determines 750 values of a similarity metric for pairs of service control (C1, C2) such that C1 represents an extracted service control from set S1 and C2 represents an observed service control from set S2. In an embodiment, the system uses the natural language models to encode the service controls and uses similarity metrics between pairs of encoded service controls, for example, cosine similarity metrics as described herein.

Based on the similarity metric values, the system selects 760 a group of matching observed service controls with corresponding service control tests. In an embodiment, the system uses a similarity threshold and excludes pairs (C1, C2) that have similarity metric values indicating less than the similarity threshold.

The system determines the top matched observed service controls and corresponding service control tests from the group of matching observed service controls with corresponding service control tests. In an embodiment, the system further finds the maximally different control from the top match, thereby obtaining two representative service controls and service control texts including: (1) the best matching service control and service control texts and (2) the service control that is maximally different from the best matching service control as well the corresponding service control texts.

The system sends the representative service controls and their corresponding service control tests as recommended service control tests, for example, for display via a user interface. Accordingly, the system provides past service control tests that were used for other organizations for similar service controls. This provides organizations with information on expected service tests for services that they provide. The system may store the set of service control tests for the identified external services in a data representation, for example, a data store. In an embodiment, the system automatically generates a report (or a portion of a report) for the organization based on the accessed service control tests.

Applications

According to an embodiment, the system obtains SOC (service organization controls) reports of various organizations and uses data-mining techniques to find criteria and subservice organization controls for services used by an organization or external services functionally similar to them. A SOC report represents written documentation of the internal controls that are likely to be relevant to an audit of the organization. SOC reports are designed to help service organizations that provide services to other entities, build trust and confidence in the service performed and controls related to the services through a report reviewed and validated by an independent auditor. A SOC report allows a reviewer to verify that an organization is following some specific best practices.

Techniques disclosed herein can be used for various applications. For example, organizations generate compliance reports describing service controls implemented for their services. Services used by the organization may invoke external services. External services may also be referred to as subservices. Organizations may perform several tasks using external services, ranging from tracking of the human resources processes, payroll, hosting databases, and various applications used by the organization. These external services may be referred to as subservices.

In order to implement a design of a system, and to be able to provide guarantees about its security and reliability, an organization may assume that the subservice organization implements a set of service controls. These service controls may also be referred to as complementary subservice organizational controls (CSOCS). The system according to various embodiments allows users to automatically create a list of service controls which are assumed to be implemented by the corresponding subservices used by the organization. The system infers a list of service controls likely to have been implemented by external services used within an organization. These external services are discovered by the system when the list of services of an organization are provided as input to the system. From the received set of services, the system determines various criteria with their corresponding CSOCS to be used in the CSOC section of a compliance report, as-is or as a starting point.

Using this collection of previously used CSOCs, the system uses natural language processing techniques disclosed herein to group, summarize and extract the most salient service controls for a given service. The system accordingly provides a list of complementary controls based on SOC reports of similar organizations. These lists may be used for generating a SOC report for the organization.

Alternative Embodiments

It is to be understood that the Figures and descriptions of the present invention have been simplified to illustrate elements that are relevant for a clear understanding of the present invention, while eliminating, for the purpose of clarity, many other elements found in a typical system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating reports based on instrumented software through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method comprising:
 receiving a plurality of documents representing reports storing information describing service controls for one or more external services, each service control represented using natural language text;
 extract from the plurality of documents a set of service controls for a category of external services;
 access a natural language model configured to receive an input natural language text and generate an encoded representation of the input natural language text;
 for each service control from the set of service controls, execute the natural language model to generate an encoded service control;
 for each of a plurality of pairs of service controls, determine similarity scores for the pair of service controls;
 determining one or more representative service controls for the category of external services based on the similarity scores of the plurality of pairs of the service controls;
 storing a mapping from categories of external services to representative service controls determined from the set of service controls corresponding to the category of external services; and
 using the mapping for determining representative service controls for external services corresponding to a set of services of an organization.

2. The computer-implemented method of claim 1, wherein determining the one or more representative service controls comprises:
 filtering the plurality of pairs of service controls to determine a subset of pairs of service controls having more than a threshold similarity score;
 grouping the subset of pairs of service controls into one or more sub-groups of pairs of service controls; and
 for a sub-group of pairs of service controls determining the representative service control.

3. The computer-implemented method of claim 2, wherein the plurality of pairs of service controls form a graph and a sub-group of pairs of service controls represents a clique of the graph.

4. The computer-implemented method of claim 2, wherein a representative service control is a centroid of the service controls of the sub-group of pairs of service controls.

5. The computer-implemented method of claim 4, further comprising:
 determining a service control that is most dissimilar to the centroid service control based on the similarity scores of the pairs of the service controls.

6. The computer-implemented method of claim 1, wherein the plurality of documents are received from one or more external systems, wherein the documents represent reports of an organization associated with the external system.

7. The computer-implemented method of claim 1, wherein the category of external services is one of:
 a category of storage services;
 a category of compute services;
 a category of networking services;

a category of document processing services, or a category of CI/CD (continuous integration/continuous delivery) provider services.

8. The computer-implemented method of claim 1, wherein using the mapping for determining representative service controls for external services corresponding to a set of services of an organization comprises:

receiving the set of services associated with an organization;

determining a set of external services invoked by services from the set of services;

determining a category of external services representing at least a subset of the set of external services; and using the mapping to determine one or more representative service controls for the determined category.

9. A computer readable non-transitory storage medium storing instructions, the instructions when executed by a computer processor cause the computer processor to perform steps comprising:

receiving a plurality of documents representing reports storing information describing service controls for one or more external services, each service control represented using natural language text;

extract from the plurality of documents a set of service controls for a category of external services;

access a natural language model configured to receive an input natural language text and generate an encoded representation of the input natural language text;

for each service control from the set of service controls, execute the natural language model to generate an encoded service control;

for each of a plurality of pairs of service controls, determine similarity scores for the pair of service controls;

determining one or more representative service controls for the category of external services based on the similarity scores of the plurality of pairs of the service controls;

storing a mapping from categories of external services to representative service controls determined from the set of service controls corresponding to the category of external services; and using the mapping for determining representative service controls for external services corresponding to a set of services of an organization.

10. The computer readable non-transitory storage medium of claim 9, wherein instructions for determining the one or more representative service controls cause the computer processor to perform steps comprising:

filtering the plurality of pairs of service controls to determine a subset of pairs of service controls having more than a threshold similarity score;

grouping the subset of pairs of service controls into one or more sub-groups of pairs of service controls; and for a sub-group of pairs of service controls determining the representative service control.

11. The computer readable non-transitory storage medium of claim 10, wherein the plurality of pairs of service controls form a graph and a sub-group of pairs of service controls represents a clique of the graph.

12. The computer readable non-transitory storage medium of claim 10, wherein a representative service control is a centroid of the service controls of the sub-group of pairs of service controls.

13. The computer readable non-transitory storage medium of claim 12, wherein the instructions further cause the computer processor to perform steps comprising:

determining a service control that is most dissimilar to the centroid service control based on the similarity scores of the pairs of the service controls.

14. The computer readable non-transitory storage medium of claim 9, wherein the plurality of documents are received from one or more external systems, wherein the documents represent reports of an organization associated with the external system.

15. The computer readable non-transitory storage medium of claim 9, wherein the category of external services is one of:

a category of storage services;

a category of compute services;

a category of networking services;

a category of document processing services, or a category of CI/CD (continuous integration/continuous delivery) provider services.

16. The computer readable non-transitory storage medium of claim 9, wherein instructions using the mapping for determining representative service controls for external services corresponding to a set of services of an organization cause the computer processor to perform steps comprising:

receiving the set of services associated with an organization;

determining a set of external services invoked by services from the set of services;

determining a category of external services representing at least a subset of the set of external services; and using the mapping to determine one or more representative service controls for the determined category.

17. A computer-implemented system comprising:

a computer processor; and a computer readable non-transitory storage medium storing instructions thereon, the instructions when executed by a processor cause the processor to perform the steps of:

receiving a plurality of documents representing reports storing information describing service controls for one or more external services, each service control represented using natural language text;

extract from the plurality of documents a set of service controls for a category of external services;

access a natural language model configured to receive an input natural language text and generate an encoded representation of the input natural language text;

for each service control from the set of service controls, execute the natural language model to generate an encoded service control;

for each of a plurality of pairs of service controls, determine similarity scores for the pair of service controls;

determining one or more representative service controls for the category of external services based on the similarity scores of the plurality of pairs of the service controls;

storing a mapping from categories of external services to representative service controls determined from the set of service controls corresponding to the category of external services; and using the mapping for determining representative service controls for external services corresponding to a set of services of an organization.

18. The computer-implemented system of claim 17, wherein instructions for determining the one or more representative service controls cause the computer processor to perform steps comprising:

filtering the plurality of pairs of service controls to determine a subset of pairs of service controls having more than a threshold similarity score;

grouping the subset of pairs of service controls into one or more sub-groups of pairs of service controls; and for a sub-group of pairs of service controls determining the representative service control.

19. The computer-implemented system of claim 17, wherein the category of external services is one of:

a category of storage services;

a category of compute services;

a category of networking services;

a category of document processing services, or a category of CI/CD (continuous integration/continuous delivery) provider services.

20. The computer-implemented system of claim 17, wherein instructions using the mapping for determining representative service controls for external services corresponding to a set of services of an organization cause the computer processor to perform steps comprising:

receiving the set of services associated with an organization;

determining a set of external services invoked by services from the set of services;

determining a category of external services representing at least a subset of the set of external services; and using the mapping to determine one or more representative service controls for the determined category.

* * * * *